United States Patent [19]
Woodford et al.

[11] 3,768,179
[45] Oct. 30, 1973

[54] EDUCATIONAL DEVICES

[76] Inventors: Charles E. Woodford, 14044 Marlowe, 48227; Wilbert C. Powe, 1927 Pasadena, both of Detroit, Mich. 48238

[22] Filed: June 19, 1972

[21] Appl. No.: 264,004

[52] U.S. Cl.................... 35/35 D, 35/9 D, 35/35 C
[51] Int. Cl. ............................................. G09b 1/08
[58] Field of Search..................... 35/9 D, 9 A, 8 A, 35/35 C

[56] References Cited
UNITED STATES PATENTS

| | | | |
|---|---|---|---|
| 3,015,895 | 1/1962 | Stall | 35/9 D X |
| 3,654,706 | 4/1972 | Perrella | 35/9 D |
| 3,246,402 | 4/1966 | Diamond | 35/9 A |

*Primary Examiner*—Wm. H. Grieb
*Attorney*—Irving M. Weiner et al.

[57] ABSTRACT

An educational device particularly adapted for teaching alpha-numeric associations includes (a) a display board having a first plurality of alpha-numeric indicia formed therein, (b) a second plurality of alpha-numeric indicia, each of which is adapted to be coincident with one of such first plurality of indicia formed in the display board, (c) means for electrically signalling the proper coincidence of each of such plurality of indicia to its respective alpha-numeric indicia formed in the display board, and (d) means for audibly reproducing the identifying sound corresponding to each of such alpha-numeric indicia.

8 Claims, 6 Drawing Figures

PATENTED OCT 30 1973 3,768,179

EDUCATIONAL DEVICES

BACKGROUND OF THE INVENTION

The present invention pertains to educational devices. More particularly the present invention relates to educational devices which tests the user's manual dexterity, optic sense and audio sense. Even more particularly, the present invention concerns educational devices for aiding teaching of alphabetical and numerical associations and the like.

The prior art is replete with educational devices designed to facilitate association with alpha-numeric indicia and the like. Yet, each of these devices only encounter the use of, at most, manual dexterity and/or either optic or audio or otic senses.

Applicants are unaware of any device, heretofore, which requires the user to test both the otic and optic senses as well as requiring manual dexterity. Thus, the present invention provides a distinct improvement over such previous educational devices.

SUMMARY OF THE INVENTION

The present invention provides an educational device adapted to require the user to employ manual dexterity, optic senses and otic senses, and which teaches alphabetical and numerical associations and the like.

Generally speaking, the device of the present invention comprises: (a) a display board having a first plurality of indicia formed therein, (b) a second plurality of indicia, each of which is adapted to be coincident with a corresponding one of such indicia of the first plurality, (c) means for electrically signalling the proper coincidence between one of the indicia of the second plurality with its corresponding indicia of the first plurality, and (d) means for audibly reproducing the sound associated with each of the indicia wherein upon proper coincidence only the sound associated with the coincident indicia is reproduced.

By superimposing the corresponding indicia of the second plurality to its respective indicia of the first plurality the means for signalling the correct coincidence is activated.

For a more complete understanding of the present invention reference is made to the following detailed description and accompanying drawing. In the drawing like reference characters refer to like parts throughout the several views in which:

DESCRIPTION OF THE PREFERRED EMBODIMENTS

At the outset it is to be noted that the present invention can be employed for teaching any type of association, such as pictorial representations, mathematical associations and the like. However, for purposes of illustrating the present invention alphabetical and numerical associations will be assumed.

Figure 1:
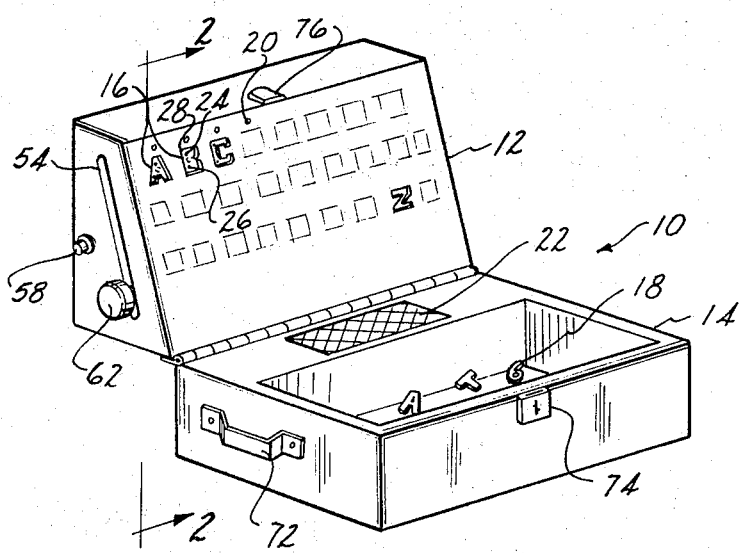
FIG. 1 is a perspective view of the device of the present invention in an open position.

Now, with reference to the drawing, and in particular FIG. 1, the present educational device, indicated at 10, generally includes a display board 12, pivotally hinged or otherwise connected to a storage base 14. At least one member or a first plurality of alpha-numeric indicia 16, is formed within the display board 12. At least one second member or a second plurality of indicia 18 is also provided which can be stored within the base 14 when not in use.

Each one member of second plurality is adapted to be coincident with its corresponding member of the first plurality when brought into engagement.

The device 10 further includes means 20 for electrically signalling proper coincidence between one of the members of the first plurality 16 with its corresponding member of the second plurality 18. The present deivce 10 further includes means 22 for audibly reproducing the sound associated with the alphanumeric indicia whereby upon proper coincidence between a member of the first plurality and its correspondent of the second plurality the sound associated therewith is presented to the user.

With more particularity and with reference to FIG. 1 the display board has a plurality of indicia 16 formed therein. The formation of the indicia is achieved by directly molding the display board with a suitable mold providing for the cavitations or recesses corresponding to the desired indicia. Alternatively, the indicia can be slightly impressed in the board, again, by molding, when coincidence is achieved magnetically as detailed subsequently.

Figure 5:
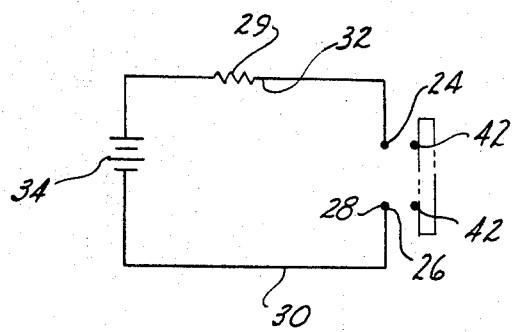
FIG. 5 shows a schematic diagram of the circuitry associated with the signalling means of the device of the present invention.

Referring to FIGS. 1 and 5 within each of the recesses forming each of the indicia of the first plurality are emplaced a pair of electrical contacts 24 and 26 which can be magnetic or magnetizable and which form a normally open switch 28, which is in electrical series with a resistance signalling means 29, such as a light bulb or the like, through wires 30, 32. The switch and resistance are connected to a suitable power source 34, which can be a battery, storable in the storage base 14, as shown, or a suitable external electrical outlet source (not shown) through a plug or the like.

Figure 6:
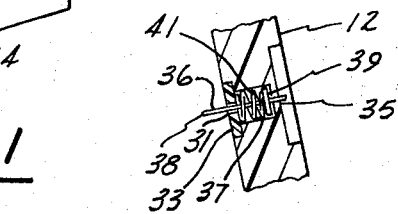
FIG. 6 is a sectional view of part of the audio means taken along the line 6 of FIG. 2.

Referring to FIG. 6 medially positioned in each of the recesses is a rod 36 having a magnetic tape pick-up brush 38 mounted on one end thereof. The other end of the rod extends through an aperture 35 formed in the recess. The rod 36 extends through a bore 37, having a throughbore 31 and a shoulder 33, which functions as a biassing means retainer and which is formed in the display board 12 and extends rearwardly therefrom, as shown. A flange 39 is provided on the shaft 36 interiorly of the housing. A biassing means, such as a spring 41, is mounted on the rod between the flange 39 and the shoulder 33 of the housing, as shown, to normally urge the rod toward the display board 12. Thus, the rod is urged against the spring when corresponding indicia of the second plurality is placed coincident with the indicia formed in the display board.

The entire means for audibly reproducing the sound associated with the indicia is described in detail subsequently.

Figure 4:
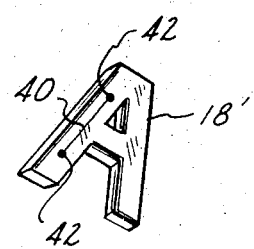
FIG. 4 depicts one of the members of the second plurality of indicia.

Referring now to FIG. 4 there is shown in detail one of the representative indicia or members 18' of the second plurality 18. The member is manufactured from a suitable dielectric material such as a non-conducting molded plastic resin or the like. Embedded within the member is a connecting wire 40 which has each of its ends connected to electrical contacts 42. The electrical contacts are substantially planar with the surface of the member which is the mirror surface of the corresponding indicia formed in the display board.

When the member 18' is urged into coincidence with its corresponding indicia formed in the display board, the contacts close the normally open switch 28 to activate the electrical circuit. Activation of the electrical circuit actuates the means for signalling thereby indicating proper coincidence of the indicia.

Optionally, and equally preferred, the member 18' can be formed from a magnetic or magnetizable and conductive material which is opposite in plurality to the contacts 24, 26, whereby magnetic forces between magnetic contacts 24, 26 and the member 18' can achieve and hold coincidence, and contemporaneously actuate the signalling means and urge the rod 36 against the spring. In such instance the first plurality of indicia can be merely impressed or silhouetted on the display board.

Figure 2:
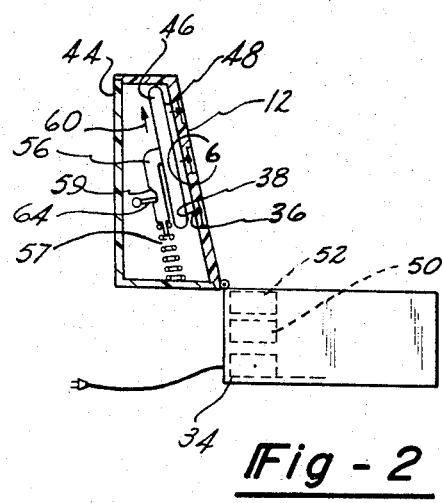
FIG. 2 is a cross-sectional view taken along the line 2—2 of FIG. 1.

With further reference now to FIGS. 1 and 2 the present device 10 further includes a housing 44 which overlies the display board 12. Optionally, the housing 44 can be integrally formed with the display board by molding or the like. An audio pick-up board 46 is mounted within the housing 44 and parallel to the display board such that when the rod 36 is urged inwardly into the housing by proper coincidence of the indicia, the magnetic pick-up brush 38 contacts the audio pick-up board.

The audio pick-up board has provided thereon a plurality of magnetic tapes 48 or strips thereof as shown in FIG. 2. On each segment of the tape 48 is a recorded sound such that upon activation of the audio system, the sound which will be reproduced from that strip by contact with the brush 38 is the one associated with the coincident indicia.

The housing 44 has a slot 54 formed therein. The slot 54 serves as a track for limiting the upward movement of the board 46. The board 46 is affixed onto a shaft 56 having its free end mounted on a low tensioned spring 57 or other similar biassing means, such that the board is normally urged upwardly in the direction shown by the arrow 60. A notch 59 is formed in the mounting shaft 56 and coacts with a releasing means 58 to limit the downward movement of the board 46 and to lock the board in position for use.

Disposed within the storage space 14 is an amplifier 50 and speaker 52 which is in electrical communication with the magnetic pick-up brush and the audio board whereby the electromagnetic impulses recorded on the tape are converted to audible sound in a manner well known to those skilled in the art.

With more particularity and with reference to FIG. 2 the board 46 is affixed to the shaft 56 at one end thereof and having its free end mounted on a lowtensioned spring 57. The shaft has a notch or other indentation 59 which engages a biassed lever 64 which comprises part of the releasing means 58, when the board is urged against the spring at a sufficient distance through the handle 62. This in effect locks the board into position and renders it ready for use. To release the lever 64 from the notch the releasing means 58 which can comprise a push button or the like is depressed to retract the lever from the notch, in a manner well known to the skilled artisan. Retraction of the lever or shaft 64 from the notch urges the audio board toward its normal position. The spring 57 is so tensioned that the normally upward force which is exerted against the audio board to return it to its normal position is such that a sufficient time lapse is provided in order to reproduce the sound associated with each indicia. Alternatively, a gearing system, (not known), can be incorporated as an alternative mode of determining and guaranteeing a slow release or return time in order to allow sufficient time to reproduce the sound.

The present invention also includes a handle 72 to allow for the easy transportability of the device.

Figure 3:
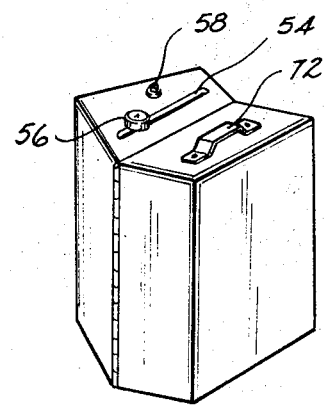
FIG. 3 is a perspective view of the device of the present invention in a closed position.

Further it is contemplated that the housing, the display board and storage space 14 can be collapsed as shown at FIG. 3, through a suitable latching mechanism shown at 74, 76. It is further contemplated, although not shown, that closing of the device through the latching mechanism 74, 76 may provide for an overriding switch such that upon closing, the electrical circuitry is completely inactivated. This is particularly important in those instances where the device is battery operated. Further, it is contemplated the first and second pluralities be color coded whereby each corresponding members thereof have their own color associated therewith to facilitate the user making proper coin-cidence.

OPERATION OF THE INVENTION

In operation the present device works in the following manner, the audio board is activated by urging the audio board against the force of the spring mounted shaft by pulling downwardly on the handle 62 which is connected to the board 46 until the board is in the locked position, i.e. when the shaft 64 engages the notch 59. A member from the second plurality of indicia is then placed coincident with its corresponding member formed in the display 12. Upon such proper coincidence the switch 28 is closed thereby activating the means for signalling proper coincidence, which signals to the user that proper coincidence has been made. Contemporaneously the brush 38 has been urged into coincidence with its proper segment of the tape 48. With the signalling of proper coincidence the release means is then actuated to release the board from the notch thereby returning the board to its normal position. During this time the magnetic tape pick-up brush which is in contact with the tape, picks up the sound and transmits it to the amplifier and speaker thereby reproducing the sound associated with the indicia. Removal of the member 18' de-energizes the signalling means and with the audio board returned to its normal position, the device is then ready for re-use, by the same procedure.

We claim:

1. An educational device comprising in combination:
   a. a display board,
   b. at least one first indicia formed in the display board,
   c. at least one second indicia which is adapted to be coincident with the first indicia,
   d. means for electrically signalling the coincidence of the first and second indicia, and
   e. means for audibly reproducing the indentifying sound associated with the indicia, said means including an audio board disposed proximate the display board, at least one magnetic tape having a sound recorded thereon and mounted on the display board, a magnetic tape pick-up brush for transmitting the recorded sound, and means for urging the brush into contact with the tape upon proper coincidence between the first and second indicia.

2. The device of claim 1 wherein the indicia are alpha-numeric indicia.

3. The device of claim 1 wherein the means for electrically signalling coincidence comprises:
 a. a power source,
 b. a normally open switch formed in the first indicia
 c. means for closing the switch formed with the second indicia, and
 d. an illumination means formed in the display board which is activated upon the closing of the switch.

4. The device of claim 3 wherein the second indicia is formed from a dielectric material having electrical contacts formed therein said electrical contacts comprising the means for closing the switch.

5. The device of claim 3 wherein the second indicia comprises a conductive and magnetic or magnetizable material such that upon coincidence between the first and second indicia the normally open switch is closed.

6. The device of claim 1 wherein the means for audibly reproducing the sound associated with the indicia further includes amplification means for rendering the sound audible.

7. The device of claim 1 having each one first indicia and each one second indicia correspond in color.

8. The device of claim 1 which further includes a housing overlying the display board and the audio board, a base means for hingedly connecting the housing and the base, and a latching mechanism for latching the housing and the base such that the device is collapsable.

* * * * *